Jan. 14, 1936.　　　　R. D. KNEALE　　　　2,027,913
SPRING SUPPORTED VEHICLE
Filed Jan. 22, 1935　　　　4 Sheets-Sheet 1
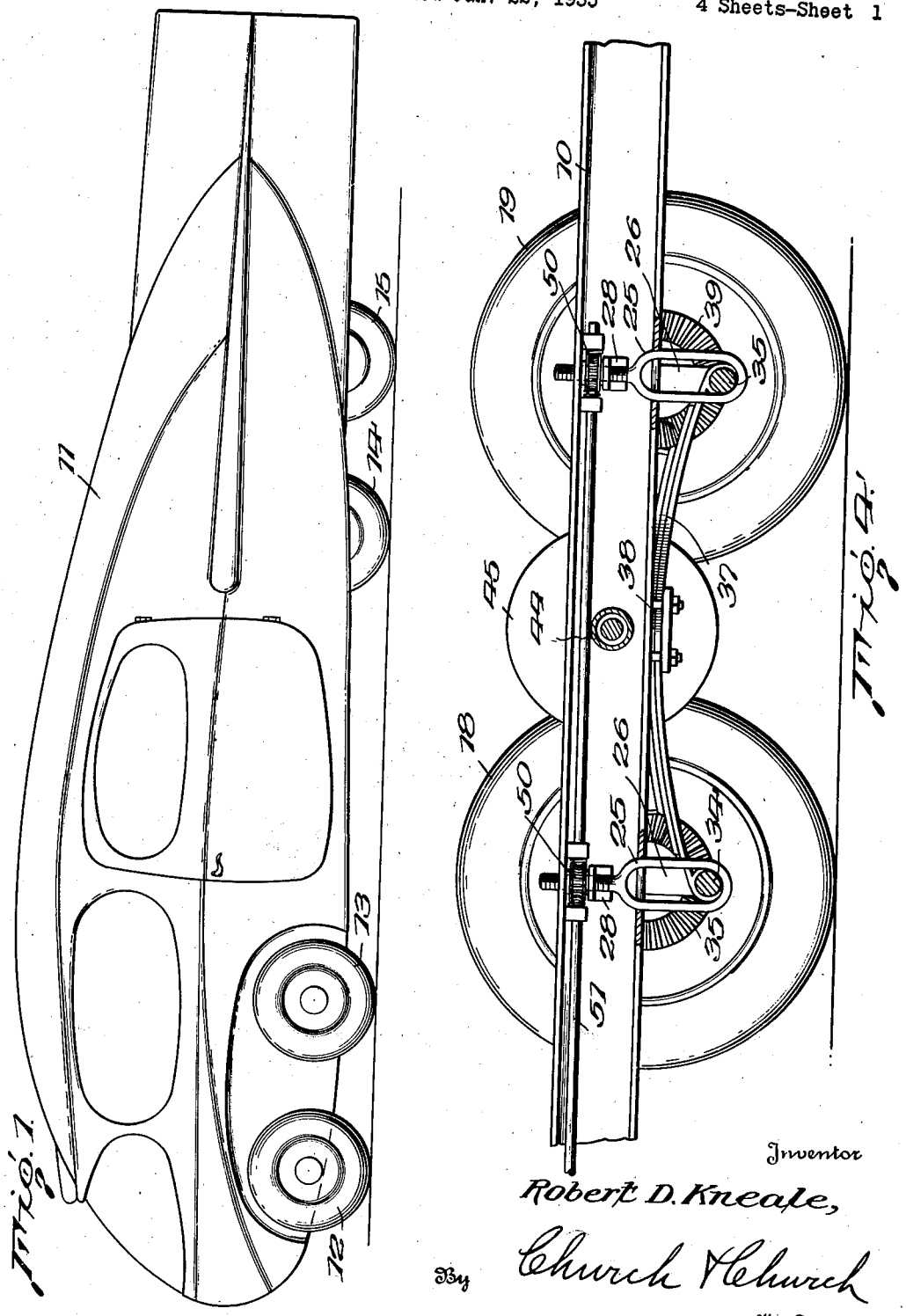
Inventor
Robert D. Kneale,
By Church & Church
His Attorneys

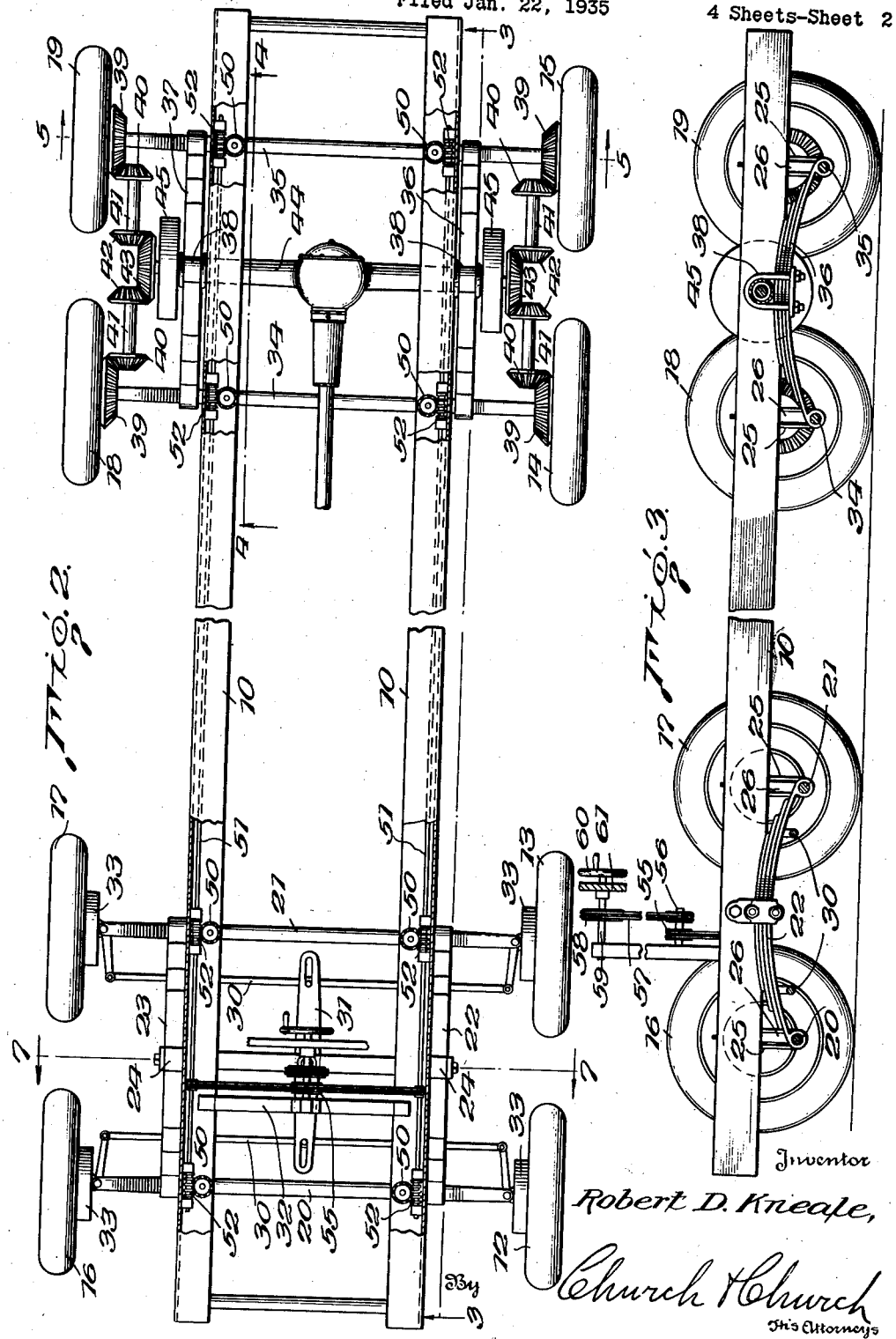

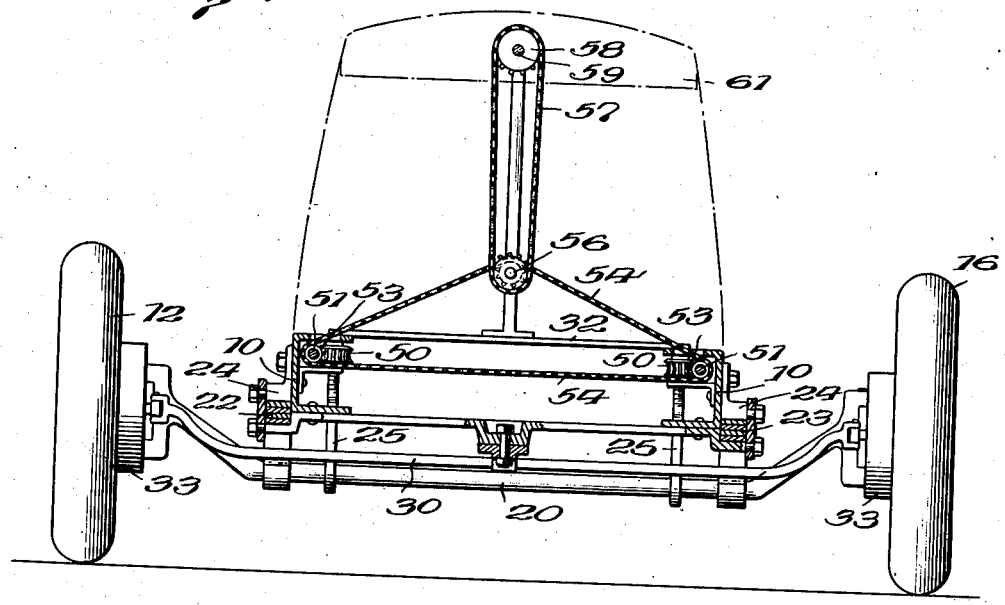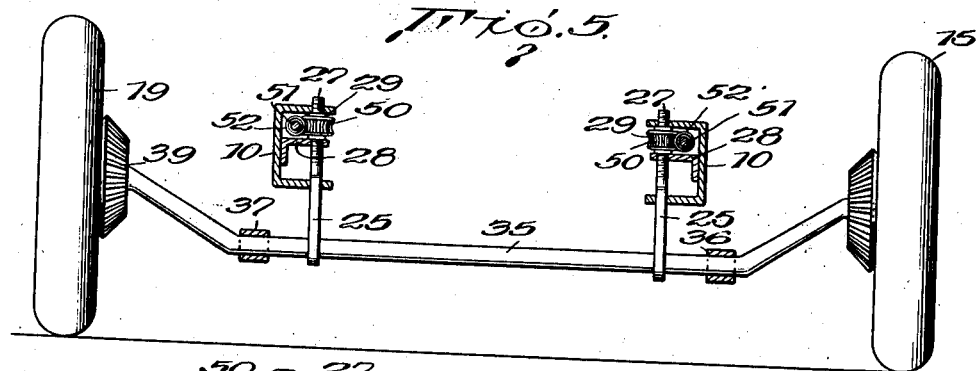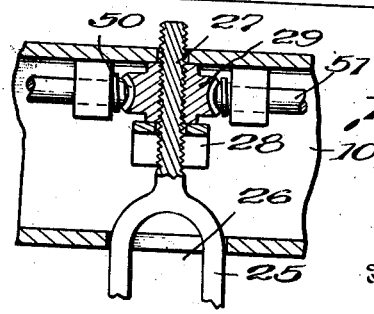

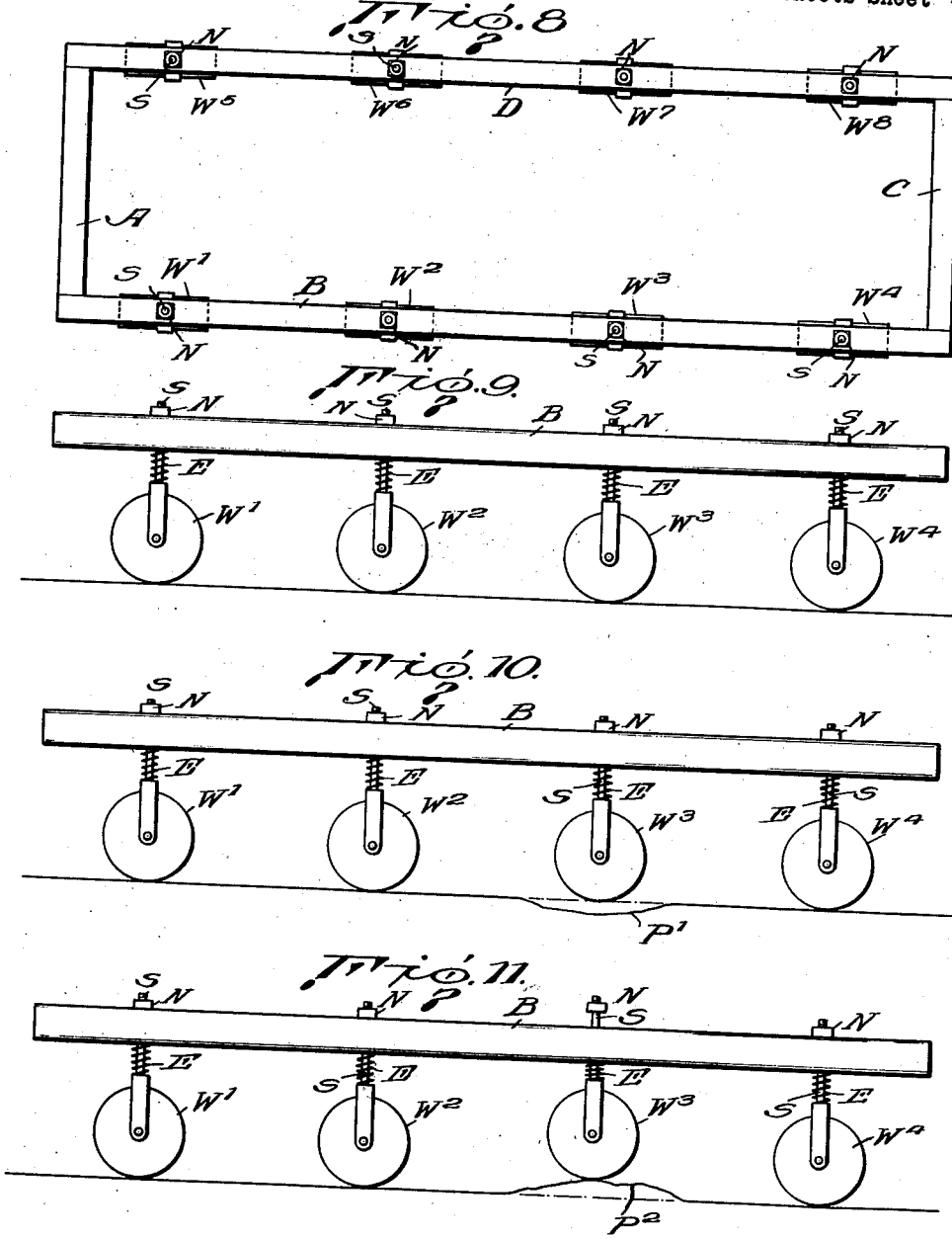

Patented Jan. 14, 1936

2,027,913

UNITED STATES PATENT OFFICE 2,027,913

SPRING-SUPPORTED VEHICLE

Robert D. Kneale, Atlanta, Ga.

Application January 22, 1935, Serial No. 2,930

9 Claims. (Cl. 280—124)

My invention relates to improvements in spring-supported vehicles and has to do, more particularly, with the mounting of the chassis frame of the vehicle on six or more road wheels.

The principal object of my invention is to provide a spring mounting for the chassis frame of a vehicle, of such a nature that the chassis frame will not rise and fall as the wheels pass over ordinary irregularities in the surface of the roadway, but will move in a plane parallel to the mean height of the surface, without any bound or pitch. By the term "ordinary irregularities", I mean those humps and depressions in the roadway surface which lie under the chassis within the limits of the wheel base, and, by the term "mean height", I mean the height that would result if all humps were planed off into the depressions until neither elevation nor depression remained.

In spring-supported vehicles, of the type heretofore known, the passing of one or more of the wheels over a hump or depression in the roadway surface causes a change in the forces acting upon the springs and a consequent change in the deflection of the springs, which is transmitted to the chassis frame, with the result that all the springs are constantly fluctuating in deflection, both above and below normal, thus causing "bound", that is, the upward and downward movement of the body, and "pitch", that is, the alternate rise and fall of each end of the vehicle with a forward and back motion, sometimes called a "gallop". It is the object of my invention, therefore, to provide a spring suspension for vehicles, of such a nature that the springs will not fluctuate in deflection, as the wheels pass over ordinary irregularities, so that the chassis frame will neither bound nor pitch.

In general, the underlying purpose of my invention is to provide a spring suspension which will give a very much smoother riding vehicle, thus conducing to the comfort of the passenger and increasing the life of the vehicle, even when it is used upon surfaces which are comparatively rough.

Further objects, and objects relating to details and economies of operation and construction, will definitely appear from the detailed description to follow. In general, I have accomplished the objects of my invention by the devices and means set forth in the following specification. My invention is clearly defined and pointed out in the appended claims. A structure constituting a preferred embodiment of my invention is illustrated in the accompanying drawings, forming a part of this specification, in which:—

Figure 1 is a view in side elevation of a motor vehicle embodying my invention.

Fig. 2 is a plan view, partly broken away, of the chassis frame, spring suspension, axles and road wheels of the motor vehicle shown in Fig. 1.

Fig. 3 is a view partly broken away, of the chassis and associated parts, taken on the line 3—3 of Fig. 2.

Fig. 4 is a detail, sectional view taken on the line 4—4 of Fig. 2.

Fig. 5 is a sectional view, taken on the line 5—5 of Fig. 2, showing one of the rear axles.

Fig. 6 is a fragmentary, sectional view showing the means for adjusting one of the stirrups.

Fig. 7 is a transverse, sectional view of the front wheel suspension, taken on the line 7—7 of Fig. 2.

Fig. 8 is a diagrammatic plan view of the chassis frame of a vehicle illustrating the principles of my invention.

Fig. 9 is a diagrammatic view in side elevation of said vehicle.

Fig. 10 is a corresponding diagram, showing one of the wheels over a depression in the roadway; and Fig. 11 is a corresponding diagram showing one of the wheels passing a hump.

In the drawings, the same reference numerals indicate the same parts throughout the several views, and the sectional views are taken looking in the direction of the arrows at the ends of the section lines.

In general, my invention consists in mounting the vehicle frame upon a plurality of supporting wheels, of such number and so located that there are more than two wheels at each side of the vehicle, and interposing, between the wheels and the vehicle frame, springs which are placed and maintained under a normal deflection greater than that which would be caused by the load when the wheels rest upon a perfectly plane, horizontal surface. In order to make clear the principle of my invention, I will refer to the diagrams, Figs. 8 to 11, inclusive, although it is to be understood that these are merely diagrammatic sketches used for the purpose of discussing the theory of my invention.

Referring to Figs. 8 and 9, I have illustrated a simple chassis frame A, B, C, D, which is mounted on eight wheels W—1, W—2, W—3, W—4, W—5, W—6, W—7, W—8, there being four wheels at each side of the vehicle. Each wheel is illustrated as carried by a yoke having a stem S, passing through a side member of the chassis frame, and a nut N screwed thereon and bearing upon the upper surface of the chassis frame. A spring E is interposed between each wheel and the frame, being illustrated in the diagram as surrounding the stem S and interposed between the lower surface of the frame and the yoke which carries the wheel. Each stem S is supposed to be free to move up and down through the hole in the chassis frame. When the nut N is left off, or backed-up, any change in the load on the spring, or any sudden rise or fall of the wheel, will cause a change in the position of the frame, resulting in a series of fluctuations in the height of the body. The amplitude of these fluctuations or oscillations diminishes after each such change until balance is again restored. If, however, the nut N is screwed up on the stem until added deflection is given to the spring, then a small added load need not further deflect the spring and there can be no reduction in that deflection due to the non-extensibility of the stem.

Fig. 9 illustrates diagrammatically such a vehicle resting on a plane, horizontal surface. Fig. 10 shows the same vehicle with the wheel W—3 passing over a depression P—1. Fig. 11 shows the same vehicle with the wheel W—3 passing over a hump or elevation P—2.

Let us first consider the case in which the nuts N are omitted or backed-up, so that they will not put any added deflection on the springs S. Suppose that the weight of the chassis and body, that is the load, resting on the eight springs S and equally distributed, is 2400 pounds, then each spring must support its share, or 300 pounds, when resting on a level surface, and the reaction of that surface against each wheel is also 300 pounds or one-eighth of the load. If, now, any load is added, each spring will be further compressed and the height of the frame above the surface reduced and, if the load is lessened, each spring will expand, thus raising the frame. If the vehicle moves over an irregular surface to the position shown in Fig. 10, then the wheel W—3 will drop into the depression P—1, causing its spring S to expand with less lift against the chassis and so carrying less than its share of the total load. The other springs must then carry more than their share of the total load and increase their deflection, causing the chassis frame to lower. In other words, the chassis frame will drop when the wheel W—3 drops into the depression P—1. Also, if any wheel passes over a hump, as P—2 in Fig. 11, the corresponding spring S must be further compressed and so must carry more than its normal share of the load, leaving less to be carried by the other springs, which are thus free to expand and, as they expand, will lift the chassis frame to a higher elevation. It is, therefore, plain that, even though the vehicle is mounted on six or more wheels, the chassis frame will rise and fall with the rise and fall of the wheels, even if the wheels are individually sprung, if the nuts N are not adjusted to place added deflection upon the springs. The mere use, therefore, of six or more individually sprung wheels will not attain the objects of my invention.

Suppose the same apparatus on a level surface, as shown in Fig. 9, with the nuts N in position on the stems S and tightened up until there is a tension in each stem of 100 pounds. No load has been added to the chassis frame, yet each spring is now carrying its 300 pounds share of the original load, plus the 100 pounds caused by tightening the nut N. In other words, the total force now compressing each spring is 400 pounds and the reaction of the surface against each wheel would have to exceed 400 pounds to further compress any spring. If the vehicle now moves over an irregular surface, as shown in Fig. 10, until the wheel W—3 passes over the depression P—1, the nut N will not allow the wheel W—3 to drop into that depression and, therefore, there will be no reaction of the ground against the wheel, and its share of the total load must now be carried by the seven remaining wheels, making one-seventh of 300 pounds, or about 43 pounds extra, to be carried by each of the other wheels, so that the reaction of the surface against such other wheels will now be the original 300 pounds plus the added 43 pounds, or a total of 343 pounds. However, it requires more than 400 pounds of such reaction to further compress any spring, so none of these springs will be further compressed and there will be no lowering of the chassis frame when the wheel W—3 passes over the depression P—1.

If, instead of a depression, the wheel W—3 passes over a hump, as P—2, Fig. 11, the spring E of wheel W—3 is too flexible to raise the entire chassis frame, so that it will be compressed further, thus exerting against the frame a force of more than 300 pounds. This extra force, however, is all used up in further deflecting or compressing the spring because no other spring can expand, due to the adjustment of the tension nuts N. A wheel passing over such a hump, accordingly, cannot raise the chassis frame at all. It is, therefore, evident that a vehicle which is mounted on six or more wheels, with springs interposed between the wheels and the chassis frame and maintained under a normal deflection greater than that which would be caused by the load when the wheels rest on a level surface, will not rise or fall as the wheels pass over ordinary irregularities in the road surface.

As I have stated, my invention contemplates the mounting of the vehicle frame upon more than two wheels at each side of the vehicle, with the springs placed under a normal deflection greater than that which would be caused by the load. In order to make clear the importance of having more than two wheels at each side of the vehicle, let us consider the diagram, Fig. 8, but with the wheels W—2, W—3, W—6 and W—7 removed, leaving the chassis frame mounted on but four wheels, two on each side thereof. Suppose the total load is now 1200 pounds, equally distributed, so that each spring will still support one quarter of that load, or 300 pounds. The nuts N are now tightened up to add another 100 pounds to the compression on each spring, as in the case previously considered. One quarter of the load now rests on each spring and, therefore, the springs must be stiff enough to lift that amount. The center of gravity of the chassis will be about at the point of intersection of two lines bisecting the chassis in two directions. Suppose now that a wheel, for example, W—4, passes over a depression P—1. It will either be suspended above the depression or drop into it. If it remains suspended, the chassis is in a state of unstable equilibrium because the center of gravity will be at the extreme edge of the line of support. As a result, the slightest wind pressure or jolt will destroy that equilibrium and cause the wheel W—4 to drop into the depression P—1, causing bounce and pitch. The wheels of a four-wheeled vehicle, therefore, cannot pass over depressions without dropping into them, even when the springs are maintained under a normal deflection greater than that caused by the load when the wheels rest on a horizontal surface. Of course, if the springs are not placed and maintained under such a normal deflection, the wheel W—4 will drop instantly into the depression P—1 because of the expansion of its spring plus the expansion in the spring diagonally opposite it. It is plain, therefore, that, in a four-wheeled vehicle, having two wheels only on each side, the chassis frame will rise and fall as the wheels pass over ordinary irregularities in the roadway, regardless of the mounting, the rise being forced by the extra stiffness of the springs that must be used when the vehicle is supported at four points only. In order to attain the objects of my invention, therefore, there should be more than two wheels at each side of the vehicle and the springs interposed between such wheels and the chassis frame should be maintained under a normal deflection greater than that which would be caused by the load when the wheels rest on a horizontal surface.

In general, each spring should be placed under a normal deflection which is greater than that which would be caused if the load were distributed among and supported by one less than the number of wheels actually used. In other words, the normal deflection under which the springs are maintained should be greater than that which would be caused by the normal share of the load resting on each spring plus the additional load transmitted to the springs when one of the wheels ceases to support its share of the load. Let L equal the total load and $a$ equal the number of wheels. Then, $$\frac{L}{a}$$

is the share of the total load resting on each spring, when all the wheels rest on a horizontal surface. When one of these wheels ceases to support its share of the load, the load resting upon the other wheels will be increased by $$\frac{L}{a}$$

and, under such circumstances, the load on each of the wheels which remains in load-supporting position will be $$\frac{L}{a-1}.$$

Each of the springs, therefore, should be placed and maintained under a normal deflection greater than that which would be caused by a total load of $$\frac{La}{a-1}$$

when all wheels rest on a level horizontal surface.

Referring now to Figs. 1 to 7, in which I have illustrated a preferred embodiment of my invention, I have shown a motor vehicle having a chassis frame 10, upon which a body 11 is mounted. The chassis frame is supported by eight road wheels 12, 13, 14, 15, 16, 17, 18, and 19, there being four of these wheels at each side of the vehicle. The four front wheels 12, 13, 16 and 17 are mounted upon the axles 20, 21, being journaled upon stub axles swiveled at the ends of the axles 20 and 21 in the usual manner. The leaf springs 22, 23, are secured intermediate their ends to the side members of the chassis frame 10, as at 24, and the free ends of said springs are connected to the axles 20, 21, by suitable clips, in the manner well understood in this art. Stirrups 25 are provided, each including an elongated recess 26, receiving the corresponding axle. Each stirrup has a threaded stem 27 (Fig. 6) which passes through a flange or bracket 28 secured to a side member of the frame 10. A nut 29 screwed upon the stem 27 engages the bracket 28, and thus determines the positioning of the lower end of the recess 26 of the stirrup with respect to the chassis frame. As illustrated, there are four of these stirrups for the two front axles 20 and 21, two of the stirrups being mounted on each of the side members of the frame.

For each of the front axles 20 and 21 there is provided the usual steering connections, including the cross-rods 30 connected, in a manner not shown, to a usual steering gear. The cross-rods 30 are pivotally connected to an equalizing bar 31, mounted on a cross-member 32, so that the steering linkage will be simultaneously actuated to swivel the front wheels in the proper direction. Each of the front wheels may be provided with an independent brake drum 33 for cooperation with braking mechanism not shown.

The rear wheels 14, 15, 18 and 19 are journaled upon a pair of rear axles 34, 35. Leaf springs 36, 37, are connected to the side members of the chassis frame intermediate their ends, as at 38, and the extremities of said springs are connected by eyes to the axles 34, 35. As in the case of the front axles, stirrups 25 are provided which are adjustably connected with the side members of the chassis frame by the threaded stems 27, extending through brackets 28 and having the nuts 29 screwed thereon and engaging the brackets, and each of these stirrups has an elongated recess 26 receiving the corresponding portion of one of the axles 34, 35, so that the positioning of the stirrups with respect to the frame limits the movement of the axles away from the frame or vice versa.

The rear wheels each have a bevel gear 39 meshing with a bevel pinion 40 on a short shaft 41 carrying a bevel pinion 42 meshing with a gear 43 on the end of a cross-shaft which is housed within a transverse casing 44. This casing houses the usual differential mechanism through which power is transmitted from the longitudinally extending power shaft to drive the gears 43 at opposite sides of the vehicle. Brake drums 45 may be provided upon the transverse shaft adjacent the gears 43 for cooperation with braking mechanism.

It will be seen that I have provided a spring supported vehicle carried by eight road wheels arranged four at each side of the vehicle. The springs 22, 23, 36, 37, are interposed between the chassis frame 10 and these wheels, that is, between the chassis frame and the axles on which the wheels are journaled. In this proposed embodiment, wheels are mounted on opposite ends of the same axle, so that, when any wheel rises or falls, it will carry its end of its axle with it, thus causing a slight tilting of the wheel at the other end of the axle. This tilting is so small that it will be negligible in its effect on riding qualities. It will appear, therefore, that my invention may be embodied in a construction making use of independently sprung wheels, or in one such as shown, in which the wheels are not independently sprung.

It will be observed that the maximum spacing between each axle and the chassis frame is controlled by the stirrups 25 through the adjustment of the nuts 27. When all of the wheels of the vehicle rest upon a perfectly level horizontal surface, the load distributed to these wheels will cause a certain deflection in the springs 22, 23, 36, 37, and a certain spacing of the axles 20, 21, 34, 35, with respect to the frame. The nuts 29 should now be screwed up so as to draw the axles still closer to the frame, thus placing the springs under greater deflection and maintaining them under such deflection. As indicated above, the springs should thus be placed and maintained under a normal deflection greater than that which would be caused, when the supporting wheels rest on a plane surface, by $$\frac{a}{a-1}$$

of the load, where $a$ represents the number of wheels. In this instance, there being eight supporting wheels, the stirrups 25 should be adjusted, by screwing up the nuts 29, until the springs have been given a deflection greater than that which would be caused by eight-sevenths of the load, when the wheels rest upon a level supporting surface.

Although I have illustrated the stirrups 25 as provided with elongated slots 26 receiving the axles and permitting a sliding movement of the axles therein, this is merely illustrative and I have used the term "stirrup" as indicative of the retaining devices illustrated, or their equivalent, including an ordinary fabric web such as is often used for a snubber.

Each nut 29 has its periphery formed into a worm gear 50 journaled on one of the side members of the chassis frame 10. There are a pair of longitudinally extending rods 51, each of which has four worm portions 52 formed therein and meshing with the worm gears 50 of the nuts 29, mounted on the corresponding side member of the chassis frame. By the rotation of the rod 51, therefore, the nuts 29 are turned upon the threaded stems 27, so as to adjust the stirrups 25 in one direction or the other. Upon the forward end of each rod 51, there is mounted a sprocket 53 and a chain 54 passes around said sprockets 53, having a driving sprocket 55, which is mounted on a shaft 56. The shaft 56 carries another similar sprocket around which runs a chain 57 leading to a sprocket 58 on a shaft 59 journaled in the cowl and having a hand wheel 60 mounted on the instrument board 61 and turning with respect to a calibrated dial upon which the spring deflection may be indicated. By turning the hand wheel 60 in one direction or the other, the rods 51 will be rotated so as to screw or unscrew the nuts 29 upon the stirrup stems 27. Thus, the operator may simultaneously adjust all of the stirrups from the driver's seat so as to place and maintain the springs under the desired normal deflection. I have heretofore indicated the principles which should guide the driver in this adjustment. The stirrups should be so adjusted that the springs are placed under a normal deflection greater than that caused by the load when the wheels rest on a horizontal surface and preferably greater than that which would be caused, in the case of an eight-wheeled vehicle, by eight-sevenths of the load.

The application of the principles of my invention to the construction of a spring-supported vehicle produces a much smoother riding vehicle than has been known heretofore. As the wheels pass over ordinary irregularities of the roadway, the chassis frame will not rise or fall, bounce or pitch, but will travel in a plane parallel to the mean height of the roadway. Thus, I have provided a vehicle which is much more comfortable to ride in and which will have a longer life because of the elimination of the wear and tear due to the constant rise and fall of the chassis frame as the wheels pass over a rough surface.

I am aware that my invention is susceptible of considerable variation without departing from the spirit thereof and, therefore, I claim it broadly as indicated by the appended claims.

What I claim is:

1. In a vehicle, the combination of a vehicle frame, a plurality of supporting axles, wheels journaled on opposite ends of said axles, there being more than two axles so that there are more than two wheels at each side of the vehicle, springs interposed between said frame and axles, and a plurality of stirrups carried by the frame and receiving the axles and so positioned with respect to the frame as to maintain the springs under a normal deflection greater than that which would be caused by the load when the wheels rest on a plane surface.

2. In a vehicle, the combination of a vehicle frame, a plurality of supporting axles, wheels journaled on opposite ends of said axles, there being more than two axles so that there are more than two wheels at each side of the vehicle, springs interposed between said frame and axles, a plurality of stirrups carried by the frame and receiving the axles, and means for simultaneously positioning the stirrups with respect to the frame to place and maintain the springs under a normal deflection greater than that which would be caused by the load when the supporting wheels rest on a plane surface.

3. In a vehicle, the combination of a vehicle frame, a plurality of supporting axles, wheels journaled on opposite ends of said axles, there being more than two axles so that there are more than two wheels at each side of the vehicle, springs interposed between said frame and axles, a plurality of stirrups carried by the frame and receiving the axles, and means operable from the driver's seat for positioning the stirrups with respect to the frame to place and maintain the springs under a normal deflection greater than that which would be caused by the load when the wheels rest on a plane surface.

4. In a vehicle, the combination of a vehicle frame, a plurality of supporting wheels so located that there are more than two wheels at each side of the vehicle, axles on which said wheels are journaled, springs interposed between said frame and axles, a plurality of stirrups receiving said axles, each stirrup having a threaded stem passing through a member fixed with respect to the frame, nuts screwed on said stems and engaging said members, said nuts having worm gear peripheries, a pair of rods journaled on said frame and having worm portions meshing with the peripheries of said nuts, and means for rotating said rods.

5. In a vehicle, the combination of a vehicle frame, a plurality of supporting wheels so located that there are more than two wheels at each side of the vehicle, axles on which said wheels are journaled, springs interposed between said frame and axles, a plurality of stirrups receiving said axles, each stirrup having a threaded stem passing through a member fixed with respect to the frame, nuts screwed on said stems and engaging said members, said nuts having peripheries formed into worm gears, a plurality of rods journaled on side members of the frame and having worm portions meshing with the peripheries of said nuts, and means for simultaneously rotating said rods.

6. In a vehicle, the combination of a vehicle frame, a plurality of supporting wheels so located that there are more than two wheels at each side of the vehicle, springs interposed between the wheels and the vehicle frame and each maintained under a normal deflection in excess of that which would be caused, when the supporting wheels rest on a plane surface, by $$\frac{a}{a-1}$$

of the load, "$a$" representing the number of wheels, and means for preventing any decrease in the deflection of the springs from normal.

7. In a vehicle, the combination of a vehicle frame, a plurality of supporting wheels so located that there are more than two wheels at each side of the vehicle, axles on which said wheels are journaled, springs interposed between said frame and axles and each maintained under a normal deflection greater than that which would be caused by the load when the supporting wheels rest on a plane surface, and means for preventing any decrease in the deflection of said springs from the normal.

8. In a vehicle, the combination of a vehicle frame, a plurality of supporting wheels so located that there are more than two wheels at each side of the vehicle, springs interposed between the wheels and the vehicle frame and each maintained under a normal deflection greater than that which would be caused by the load when the supporting wheels rest on a plane surface, and means for simultaneously stressing said springs to place them under normal deflection.

9. In a vehicle, the combination of a vehicle frame, a plurality of supporting wheels so located that there are more than two wheels at each side of the vehicle, springs interposed between the wheels and the vehicle frame and each maintained under a normal deflection greater than that which would be caused by the load when the wheels rest on a plane surface, and means operable from the driver's seat for stressing said springs to place them under said normal deflection.

ROBERT D. KNEALE.